United States Patent Office 3,667,746
Patented June 6, 1972

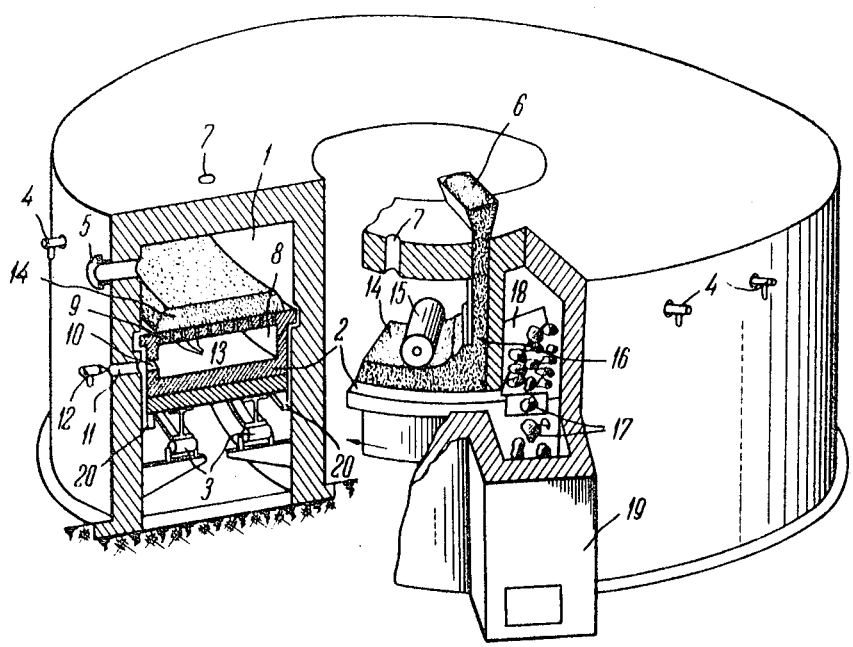

3,667,746
FURNACE FOR CONTINUOUS HEAT PROCESSING OF VARIOUS MATERIALS
Gleb Nikolaevich Makarov, Ulitsa Gotvalda 14, kv. 53; Boris Nikolaevich Zhitov, Trifonovskaya ulitsa 61, kv. 3; Anatoly Mikhailovich Zagorets, Nizhne-Pervomaiskaya ulitsa 3, kv. 57; Jury Germanovich Korolev, Universitetsky prospekt 6, korpus 2, kv. 68; and Konstantin Ivanovich Syskov, Federativny prospekt 6, korpus 6, kv. 47, all of Moscow, U.S.S.R.; Jury Yakovlevich Filonenko, Ulitsa Perova 45, Lipetsk, U.S.S.R.; Semen Semenovich Dvorin, Eniseiskaya ulitsa 16/21, kv. 27; and Ruvim Zinovievich Lerner, Ulitsa Marii Ulvanovoi 17, korpus 2, kv. 4, both of Moscow, U.S.S.R.; Fuat Akhtemovich Mustafin, Tagil, Gazetnava ulitsa 80/29, kv. 10; and Alexandr Semenovich Semenov, Ulitsa K. Marxa 99, kv. 52, both of Nizhny Tagil, U.S.S.R.; and Leonid Iosifovich Erkin, Ulitsa Malysheva 76, kv. 36; Nikolai Sergeevich Grayaznov, Ulitsa Malysheva 76, kv. 5; Izrail Mikhailovich Lazovsky, Ulitsa Malysheva 76, kv. 10; and Petr Yakovlevich Nefebov, Ulitsa Titova 18, kv. 7, all of Sverdlovsk, U.S.S.R.
Filed Jan. 29, 1970, Ser. No. 6,800
Int. Cl. F27b 17/00
U.S. Cl. 266—21                                5 Claims

ABSTRACT OF THE DISCLOSURE

A furnace for continuous heat processing of various materials comprising a ring-shaped hearth with a platform for placement of the material to be processed, the hearth being rotatable in an annular passage of the furnace. The hearth is hollow and has an inner chamber for passing combustible gases from a burner to the material via apertures in the platform.

---

The present invention relates to metallurgical and chemical equipment and, more particularly, the invention relates to furnaces for continuous processing of various materials. The proposed furnace can be used for producing blast-furnace, foundry, electrode, oil and other kinds of coke as well as a fuel for agglomeration of ores, for producing ferroalloys, phosphorus, calcium carbide and charcoal and for other purposes (e.g., for baking of various materials).

Known in the art is a furnace for heat processing of various materials, having a ring-shaped hearth located in an annular passage of the furnace and used for placing thereon a processed material.

The ring-shaped hearth is mounted on rollers so that it is capable of being rotated in a horizontal plane. The hearth platform is loaded with the material which in the course of one turn of the hearth is thermally processed by means of the heat released by the gas fired in a special combustion channel above the layer of the material.

The known furnace is disadvantageous in that it does not provide for intensive heating of the processed material and does not permit the thermal oxidation of the processed material to be effected.

A specific object of the invention is to provide such a furnace for heat processing of various materials which will make it possible to ensure high-temperature heating of the processed material, to vary within a wide range the rate of heat treatment of the material at various stages of the process and to effect thermal oxidation of this material. This will permit various materials to be processed in the furnace to produce a final product of a predetermined quality.

This object is attained by providing a furnace for continuous heat processing of various materials comprising a ring-shaped hearth having a platform on which there is placed a material to be processed, the ring-shaped hearth being located within an annular passage of the furnace and being rotated by a drive; according to the invention, the ring-shaped hearth is provided with an inner chamber for passing the combustible gases.

Other objects and advantages of the invention will be apparent from the following description when read in connection with the accompanying drawing, the sole figure of which shows a sectional diagrammatic view of the furnace for continuous heat processing of various materials.

The furnace for continuous heat processing of various materials has an annular passage 1 whose walls are composed of refractory brick. Arranged inside the annular passage 1 is a ring-shaped hearth 2 for a processed material which is mounted on rollers 3 and is capable of revolving in a horizontal plane.

The walls of the annular passage 1 are equipped with burners 4 for heating the material being processed in the furnace and with an outlet connection 5 for exhausting the combustion products and the products of thermal decomposition of the fuel.

In the case of muffle heating of the processed material, the upper portion of the passage 1 may be provided with an annular heating chamber (not shown) formed by the refractory heat-conductive cover separating the under-roof space of the furnace from the combustion products. The heating chamber may be composed of hollow blocks having an optional cross section (rectangular, round, etc.) through the cavities of which there is forced a gaseous heat carrier.

In the case of direct heating of the material loaded into the furnace, depending on the kind of the processed material and the requirements of the quality of the final product, the roof of the annular passage 1 or its separate sections may be equipped with panel burners for infrared radiation (not shown).

Depending on the width of the ring-shaped hearth, the roof of the stationary annular passage 1 may be suspended or made as a tied arched member. Provided in the roof of the annular passage 1 are a loading bunker 6 and inspection windows 7.

The ring-shaped hearth 2 has an inner annular chamber 8 for passing the gases heating the platform 9 of the ring-shaped hearth 2. The annular chamber 8 may either be made continuous along the whole length of the ring-shaped hearth 2 or be divided into sections along the length of the ring-shaped hearth 2 to provide for variable heating of the platform 9, and, hence, of the processed material.

The platform 9 may be flat, as shown in the drawing, or trough-shaped (in the case of heat processing of liquid or softening materials). Provided in the side walls of the ring-shaped hearth 2 are channels 10 for passing the heating gases which pass through the passage 11 from the burners 12.

The platform 9 of the ring-shaped hearth 2 is provided with apertures 13 for passing the heating gases from the internal annular chamber 8 through the layer 14 of the processed material and this makes it possible to intensify the heating of the processed material and, if necessary, to effect its thermal oxidation.

Adjacent the loading bunker 6 in the direction of rotation of the ring-shaped hearth 2 (shown by an arrow in the drawing) there is mounted a roller 15 for leveling and densitfying the solid material fed onto the hearth for the heat processing, said roller providing for the required density, shape and size of the lumps of the final product.

The ready hot product 17 is removed from the hearth 2 by means of a plough 18 which either is made of metal and provided with a water cooling system or is made of a refractory ceramic material. The plough may be replaced by a drag conveyer or by any other similar device. The ready hot product 17 of the process is unloaded into a bunker 19 for dry quenching wherein it is cooled to a required temperature.

Two annular hydraulic gates 20 are provided for separating the inner space of the furnace from the ambient medium.

The furnace for continuous heat processing of various materials operates as follows.

The material 16 is to be processed is continuously fed onto the rotary ring-shaped hearth 2. Depending on the kind of the processed raw material and the requirements of to the final product, the mateiral loaded onto the ring-shaped hearth may be solid (lumpy or powdery), liquid or softening, such as pitch. When using a solid material, the roller 15 evens the material 16 fed onto the ring-shaped hearth, forms it and provides for the required density and thickness of the layer 14 of the material being processed.

When the ring-shaped hearth 2 rotaates in the direction shown by the arrow in the drawing, the material positioned thereon as a formed layer 14 is thermally processed in accordance with the prescribed operation by using the thermal energy of the heataing gas combusted thereabove in the burners 4 and in the annular chamber 8 or by using the steam-gas products evolving from the processed material or a combination of both. Thermal oxidation of the processed material can be effected simultaneously with the processing due to penertation of the gases produced in the burners 12 through the passages 11 and 10 and through the annular chamber 8 and apertures 13 as well as through the layer 14 of the processed material.

By controlling the temperature in the under-roof space of the furnace above the processed material by changing the consumption of the combustible gas fed to the burners 4 and by properly arranging the burners 4 along the circle of he annular passage 1 of the furnace, it is possible to create several temperature zones along the length of the annular passage 1 of the furnace, which, in turn, makes it possible to carry out the process of heat treatment of the material in stages, each being characterized by a different rate of increase of the temperature of the layer 14 of the material being processed.

Each portion of the materail 16 loaded on the hearth 2 passes all the stages of the process during the rotation of the hearth 2 so that at the end of a complete turn of this hearth, the temperature of the layer 14 of the processed material is elevated to the necesary limtitng value.

The ready hot product in the form of lumps 17 is expected by the plough 18 from the hearth 2 into the bunker 19 for dry quenching and cooling of this product (for example coke).

If the hearth 2 has a considerable width, the ready hot product can be removed from the hearth by a special pusher.

From the bunker 19 for dry quenching the cooled ready product is discharged through a special gate (not shown).

A vacuum in the annular passage 1 of the furnace is controlled by means of proper suction of the gases through the connections 5. The same method is used for controlling the amount of the gases forced through the layer 14 of the material and through the apertures 13 from the inner chamber 8 of the hearth 2.

When effecting muffle heating of the mateiral, the volatile products formed in the material during the heat processing are removed through the connections 5. In this case, it is possible to trap the formed chemical products without their dilution with the waste products of the combustible gas and to direct them for condensation and further utilization.

The construction of the proposed furnace, depending on the kind of the processed material and the desired quality of the final product, makes it possible to effect a continuous process of making such products as, metallurgical coke, non-metallurgical coke and chemical products of carbonization, low-ash coke for producing carbon-graphite materials, and charcoal.

On producing metallurgical coke from low-baking coal, the processed material can be preheated in the bunker 6 and with the help of the roller 15 this material can be formed into lumps of a prescribed shape and size.

The provision of widely variable technological parameters of the process of heat treatment of materials in the proposed furnace makes it possible to obtain the necessary quality of the final product and the required size of its lumps.

The construction of the furnace makes it possible to effect the heat processing of a briquetted material with simultaneous thermal oxidation of the briquettes. In this case, unlike the process in the known furnaces, the briquettes in the proposed furnace are not subjected to mechanical effects and are not damaged.

For production of non-metallurgical coke and chemical products of carbonization, the proposed furnace can be operated on gas and long-flame coal as well as on lignite and peat.

The yield and quality of the volatile chemical products formed in the process of heat treatment of materials can be varied within a wide range as the rate of decomposition of the material can be changed when the material passes different temperature zones formed in the furnace due to a change of the temperature in the under-roof space of the furnace and that of the platform 9 of the ring-shaped hearth 2. The composition of the chemical products removed from the furnace is also determined by the place of their removal on the circle of the furnace.

When processing liquid and softening materials, for example, pitch, resins, residual oil, coal pitch mixtures, the materials can be loaded through several loading devices installed in series in the direction of rotation of the hearth 2 and this makes it possible to better utilize the volume of the furnace and to improve the quality of the final product.

Due to the fact, that the proposed furnace is hermatically sealed, in the process of carbonization of, e.g. pitch in this furnace, there are provided more favorable conditions of labor for the operating personnel than in the case of the known furnaces of this type.

Thus, the construction of the proposed furnace providing for thermal processing of a layer of a material placed on the hollow movable hearth and heated to a required temperature makes it possible to widely vary the conditions of the heat treatment, depending on the technological properties of the processed raw materials and the requirements to be met by the quality of the final product.

The simple method of effecting the required process of heat treatment of various materials in the proposed furnace as well as flexible control of this process make the furnace a versatile apparatus. The transfer from one kind of raw material to another as well as a change in the requirements for the quality of the produced final product are not associated with a prolonged stoppage of the furnace and its complete reconstruction. The possibility of an easy change of the technological parameters of the process makes the proposed furnace a reliable unit for producing various final products such as metallurgical, foundry, electrode, oil and other kinds of coke, a fuel for agglomeration of ores, for producing ferroalloys, phosphorus calcium carbide, charcoal, for baking various materials, calcination of briquettes, etc.

The proposed furnace has a simple construction which widens the scope of utilization of this furnace and alleviates the problem of automation and mechanization of the process. The furnace is made of available and inexpensive materials and does not require frequent repairs and high consumption of electric energy, water or steam.

The simple construction of the furnace and ease in change of the requirement of heat processing of materials assist in starting and stopping the furnace as well as in the conduction of planned repair works and inspection of separate units of the furnace within a short period.

What is claimed is:

1. A furnace for continuous heat treatment of various carbonaceous materials, said furnace comprising: walls defining an annular passage, an annular hearth in said passage having an upper platform for placement of a material to be treated, means for rotating said hearth through said passage, said hearth being hollow and provided with an inner chamber, said platform having apertures leading to said inner chamber, burner means for introducing a combusible gas into said inner chamber which can pass through said apertures to the material on said platforms, means for discharging the combustible gases from said annular passage after passage of the gases through said material on the platform, and further burner means for introducing combustible gas directly into said annular passage through the walls thereof.

2. A furnace as claimed in claim 1 wherein said apertures extend uniformly across the width of the platform.

3. A furnace as claimed in claim 2 comprising means for introducing material to be treated onto said platform, means to level said material and densify the same, and means for discharging the heat treated material from the annular passage after the material has undergone one complete turn through said annular passage.

4. A furnace as claimed in claim 3 wherein the further burner means comprises a plurality of burners distributed circumferentially around said annular passage.

5. A furnace for continuous heat treatment of various carbonaceous materials, said furnace comprising: walls defining an annular passage, an annular hearth in said passage having an upper platform for placement of a material to be treated, means for rotating said hearth through said passage, said hearth being hollow and provided with an inner chamber, said platform having apertures leading to said inner chamber, burner means for introducing a combustible gas into said inner chamber which can pass through said apertures to the material on said platform, said burner means comprising burners distributed around said walls at the level of said inner chamber to effect stepwise heat treatment of the material on the hearth while controlling the rate of temperature rise in each step separately, and means for discharging the combustible gases from said annular passage after passage of the gases through said material on the platform.

References Cited
UNITED STATES PATENTS

| 1,582,952 | 5/1926 | Wedge | 110—36 |
| 1,075,011 | 10/1913 | Christensen | 266—21 |
| 3,460,818 | 8/1969 | Greves et al. | 266—21 |

GERALD A. DOST, Primary Examiner

U.S. Cl. X.R.

110—36